(12) United States Patent
Auranen et al.

(10) Patent No.: US 9,973,905 B2
(45) Date of Patent: May 15, 2018

(54) COMMUNICATION APPARATUS, A COMMUNICATION ARRANGEMENT AND A COMMUNICATION METHOD

(71) Applicant: SAVOX INTERNATIONAL S.A., Luxembourg (LU)

(72) Inventors: Pasi Auranen, Salo (FI); Pasi Pihlajaniemi, Kauniainen (FI)

(73) Assignee: SAVOX INTERNATIONAL S.A., Luxembourg (LU)

( * ) Notice: Subject to any disclaimer, the term of this patent is extended or adjusted under 35 U.S.C. 154(b) by 0 days. days.

(21) Appl. No.: 14/911,084

(22) PCT Filed: Aug. 9, 2013

(86) PCT No.: PCT/FI2013/050791
§ 371 (c)(1),
(2) Date: Feb. 9, 2016

(87) PCT Pub. No.: WO2015/018967
PCT Pub. Date: Feb. 12, 2015

(65) Prior Publication Data
US 2016/0183067 A1    Jun. 23, 2016

(51) Int. Cl.
*H04B 10/25* (2013.01)
*H04W 4/10* (2009.01)
(Continued)

(52) U.S. Cl.
CPC .............. *H04W 4/10* (2013.01); *H04B 10/11* (2013.01); *H04B 10/40* (2013.01); *H04L 65/4061* (2013.01)

(58) Field of Classification Search
CPC ................................................ H04B 10/2503
See application file for complete search history.

(56) References Cited

U.S. PATENT DOCUMENTS 4,817,204 A    3/1989  Jannelli et al.
5,020,135 A *  5/1991  Kasparian ............. H04W 88/02
                                                370/277
(Continued)

FOREIGN PATENT DOCUMENTS

EP    1 947 830 A1    7/2008
EP    2 273 699 A1    1/2011

OTHER PUBLICATIONS

International Search Report, dated Jun. 6, 2014, from corresponding PCT application.

*Primary Examiner* — Shi K Li
(74) *Attorney, Agent, or Firm* — Young & Thompson

(57) ABSTRACT

Apparatus for controlling push-to-talk communication over a professional mobile radio includes a control portion including a first optical transceiver portion for converting an optical downlink signal into an electrical downlink signal for presentation to a user and for converting an electrical uplink signal into an optical uplink signal for provision to a radio portion; one or more interface portions, each connected to the control portion by an optical link, each connectable to a respective radio portion by electrical connection, which radio portion enables communication via a respective wireless communication link over one or more communication channels, each interface portion including a second optical transceiver portion for converting a downlink signal received from the respective radio portion as an electrical signal into the optical downlink signal for provision to the control portion and for converting the optical uplink signal into an electrical uplink signal for provision to the respective radio portion.

17 Claims, 4 Drawing Sheets

(51) Int. Cl.
*H04L 29/06* (2006.01)
*H04B 10/40* (2013.01)
*H04B 10/11* (2013.01)

(56) References Cited

U.S. PATENT DOCUMENTS

| | | |
|---|---|---|
| 2004/0096222 A1 | 5/2004 | Cagenius |
| 2007/0004464 A1 | 1/2007 | Lair et al. |
| 2009/0264144 A1 | 10/2009 | Shigeta |
| 2011/0034125 A1 | 2/2011 | Preston et al. |
| 2014/0314061 A1* | 10/2014 | Trajkovic ......... H04B 10/25754 370/338 |

* cited by examiner

COMMUNICATION APPARATUS, A COMMUNICATION ARRANGEMENT AND A COMMUNICATION METHOD

FIELD OF THE INVENTION

The invention relates to a communication apparatus or a communication arrangement that enables a single user or a group of users in a shared location to communicate with one or more remote users or remote groups of users. In particular, some embodiments of the invention relate to such communication apparatus or arrangement including an optical connection between radio portion(s)/unit(s) and control portion(s)/unit(s) of the communication arrangement.

BACKGROUND OF THE INVENTION

A communication arrangement for use by a single user or by a group of users sharing the same location for communicating with one or more remote users or groups of users may be provided as a combination of separate components, interconnected by electrical connections such as electrical wiring. Such a communication arrangement may be referred to as a distributed communication arrangement as opposed to an integrated communication arrangement hosting all components of the communication arrangement in a single device.

FIG. 1 schematically illustrates a communication arrangement 100 as an example of a distributed communication arrangement. The communication arrangement 100 comprises a control unit 110 and one or more radio units 140-i (representation in the illustration of FIG. 1 by radio units 140-1 and 140-2). Each of the radio units 140-i is coupled to the control unit 110 by respective electrical wiring 120-i. The connections between the components are, typically, provided using electrical cables that are detachably connectable to the control unit 110 and to the radio units 140-i. The radio units 140-i are operated as professional mobile radios (PMR) known in the art, each of the radio units 140-i arranged to enable point-to-point or point-to-multipoint communication between the respective radio unit 140-i of the communication arrangement 100 and one or more corresponding remote radio units. The control unit 110 is provided with audio input means (e.g. a microphone provided in or connected to the control unit 110) for receiving audio input from the user of the communication arrangement 100 and with audio output means (e.g. one or more loudspeakers provided in or connected to the control unit 110) for reproducing audio to the user of the communication arrangement 100. The control unit 110 is further provided with an user interface that enables the user of the communication arrangement 100 to control audio communication with other users, e.g. by using the push-to-talk (PTT) method known in the art, employing the radio unit 140-i of his/her choice. Hence, the electrical wirings 120-i of the communication arrangement 120-i carry audio signals between the control unit 110 and the radio units 140-i, as well as control signals from the control unit 110 to the radio units 140-i.

Applying a distributed communication arrangement, such as the communication arrangement 100, instead of an integrated one arrangement enables flexibility in selecting the components, such as audio input/output means, radio units (140-i) and control units (110) of desired type and characteristics to meet the requirements of a desired usage scenario. Moreover, the distributed approach makes replacing a component of the communication arrangement with a new one (e.g. due to damage or malfunction) a straightforward task, while at the same time it enables the user also to reconfigure the communication arrangement 100 by connecting only the radio unit(s) 140-i that are currently needed. Yet further, the distributed approach contributes to improved usability of the communication arrangement by enabling the user arranging (or wearing) the components in positions that facilitate ease of use and good performance in usage conditions that involve extensive user activity and/or mobility, as well as easy and reliable hands-free operation. To this end, the components of a distributed communication arrangement are typically provided as wearable components or components that can be otherwise mounted to the clothes or other gear worn or carried by the user of the communication arrangement or that can be mounted to fixed structures in the location of the user. Such distributed communication arrangements are typically applied in professional use where performance requirements for the communication arrangement are high and where easy and reliable 'hands-free' operation of the communication arrangement plays an important role. Such usage scenarios include military use (both in combat and training conditions), as well as use e.g. by the police, by firefighters, by construction workers, etc.

Designing a distributed communication arrangement comprising multiple components for professional use, where the components typically originate from different manufacturers, requires careful selection, configuration and testing of the components of the arrangement as well as the arrangement as a whole. Due to electrical connection between the components, it is typically important to take measures that ensure electrical compatibility between the components of the arrangement in order to guarantee performance fulfilling requirements related to the quality, reliability and safety of the communication. In particular, the communication arrangement may need to show compliance to regulations regarding electromagnetic compatibility (EMC) and/or intrinsic safety (IS) in order to certify the communication arrangement as applicable for certain professional use.

Regarding EMC, examples of EMC standards and regulations include the ones specified in the Directive 2004/108/EC of the European Parliament and of the Council of 15 Dec. 2004. Regarding IS, examples of IS regulations include the Directive 94/9/EC of the European Parliament and the Council of 23 Mar. 1994 for equipment and protective systems intended for use in potentially explosive atmospheres (ATEX), International Electrotechnical Commission System for Certification to Standards Relating to Equipment for use in Explosive Atmospheres (IECEx system), as well as IS certifications provided by Factory Mutual (FM) Research Corporation and Underwriters Laboratory (UL) (in the United States). Examples of FM standards in this regard include FM 3600 (Approval Standard for Electrical Equipment for Use in Hazardous (Classified) Locations—General Requirements, Class Number 3600, December 2011) and FM 3610 (Approval Standard for Intrinsically Safe Apparatus and Associated Apparatus for Use in Class I, II, and III, Division 1, Hazardous (Classified) Locations, Class Number 3610, January 2010). Examples of UL standards in this regard include UL 913 (Intrinsically Safe Apparatus and Associated Apparatus for Use in Class I, II, and III, Division 1, Hazardous (Classified) Locations, Jul. 29, 1988) UL 60079-0 (Explosive Atmospheres—Part 0: Equipment—General Requirements, ed.5, Oct. 21, 2009) ad UL 60079-11 (Explosive Atmospheres—Part 11: Equipment Protection by Intrinsic Safety 'I', ed. 5, Sep. 30, 2009).

Conformance to desired performance requirements and regulations related to EMC and/or IS are likely to further complicate the process of matching the components of the communication system to operate together, possibly leading to sub-optimal performance of some components of the communication arrangement or even compromised quality of communication due to ill-matching or even conflicting requirements of the components employed in the arrangement. In particular, modifying such a distributed communication arrangement e.g. by introducing an additional component, removing one of the existing components and/or replacing one of the existing components with a new one is likely to require re-configuration of the components of the of the communication arrangement and/or re-configuration of the communication system as a whole in order to guarantee desired quality and reliability of communication—as well as re-testing of conformance to relevant EMC and/or IS regulations. Such re-configuration and re-testing may be time-consuming, inconvenient and in many cases also costly.

SUMMARY OF THE INVENTION

It is an object of the present invention to provide a distributed communication arrangement that facilitates straightforward configuration and re-configuration.

According to a first aspect of the invention, an apparatus for controlling push-to-talk communication over a professional mobile radio is provided. The apparatus comprises a control portion for controlling the push-to-talk communication, the control portion comprising a first optical transceiver portion configured to convert an optical downlink signal into an electrical downlink signal for presentation to a user and to convert an electrical uplink signal into an optical uplink signal for provision to a radio portion. The apparatus further comprises one or more interface portions, each interface portion connected to the control portion by an optical link, each interface portion connectable to a respective radio portion by electrical connection, which radio portion enables communication via a respective wireless communication link over one or more communication channels, each interface portion comprising a second optical transceiver portion configured to convert a downlink signal received from the respective radio portion as an electrical signal into said optical downlink signal for provision to the control portion and to convert said optical uplink signal into an electrical uplink signal for provision to the respective radio portion The uplink and downlink signals may comprise audio signals. One or more of the interface portions may comprise an audio processing portion configured to apply radio portion specific audio processing. Alternatively or additionally, the control portion may comprise an audio processing portion configured to apply radio portion independent audio processing.

According to embodiment second aspect of the invention, an arrangement for push-to-talk communication over a professional mobile radio is provided. The arrangement comprises an apparatus according to the first aspect of the invention and the one or more radio portions, each connected to the respective interface portion by electrical connection.

According to embodiment third aspect of the invention, a method for controlling push-to-talk communication over a professional mobile radio is provided, where the method is applied in an apparatus comprising a control portion for controlling the push-to-talk communication and one or more interface portions, each interface portion connected to the control portion by an optical link, each interface portion connectable to a respective radio portion by electrical connection, which radio portion enables communication via a respective wireless communication link over one or more communication channels. The method comprises providing an uplink signal over an optical link, comprising converting, in the control portion, an electrical uplink signal into an optical uplink signal for provision to an interface portion, providing said optical uplink signal over the respective optical link to an interface portion, and converting, in the interface portion, the optical uplink signal into an electrical uplink signal for provision to the respective radio portion. The method further comprises providing a downlink signal over an optical link, comprising converting, in an interface portion, a downlink signal received from the respective radio portion as an electrical signal into an optical downlink signal for provision to the control portion, providing said optical downlink signal over the respective optical link to the control portion, and converting, in the control portion, said optical downlink signal into an electrical downlink signal for presentation to a user.

In the method, the downlink and uplink signals may comprise audio signals. Moreover, the provision of the uplink signal may comprise applying, in an interface portion, radio portion specific audio processing for adapting characteristics of the electrical uplink audio signal to meet requirements of the respective radio portion and provision of the downlink signal may comprise applying, in an interface portion, radio portion specific audio processing for adapting characteristics of the electrical downlink audio signal to meet the requirements of the control portion. Alternatively or additionally, providing the uplink signal may comprise applying, in the control portion, generic audio processing for adapting characteristics of the electrical uplink audio signal to meet requirements for an audio signal suitable for presentation to the user and providing the downlink signal may comprise applying, in the control portion, generic audio processing for adapting characteristics of the electrical downlink audio signal for an audio signal suitable for presentation to the user.

The exemplifying embodiments of the invention presented in this patent application are not to be interpreted to pose limitations to the applicability of the appended claims. The verb "to comprise" and its derivatives are used in this patent application as an open limitation that does not exclude the existence of also unrecited features. The features described hereinafter are mutually freely combinable unless explicitly stated otherwise.

The novel features which are considered as characteristic of the invention are set forth in particular in the appended claims. The invention itself, however, both as to its construction and its method of operation, together with additional objects and advantages thereof, will be best understood from the following detailed description of specific embodiments when read in connection with the accompanying drawings.

DETAILED DESCRIPTION

Figure 1:
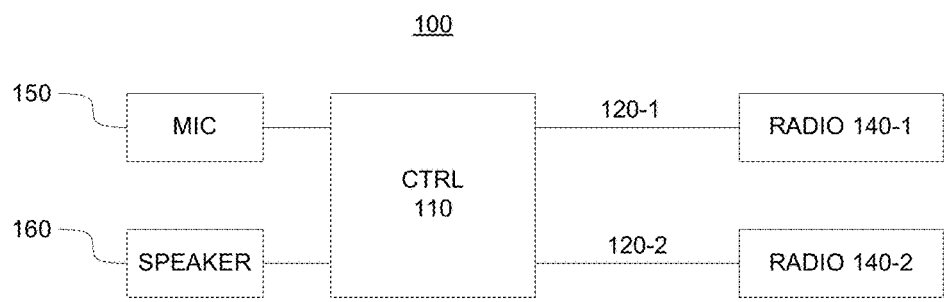
FIG. 1 schematically illustrates an example of a distributed communication arrangement or apparatus.
Figure 2:
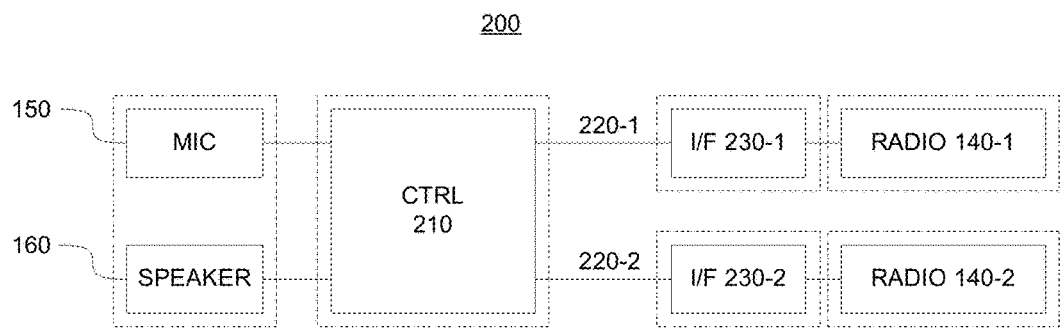
FIG. 2 schematically illustrates some components of an exemplifying communication arrangement or apparatus in accordance with an example embodiment of the invention.

FIG. 2 schematically illustrates some components of an exemplifying communication arrangement 200. The communication arrangement 200 comprises a control portion 210 for controlling operation of radio portions 140-1 and 140-2, (representing one or more radio portions, which may be also referred to as radio portion(s) 140-$i$ or radio portions 140). The arrangement 200 further comprises interface portions 230-1 and 230-2 (representing one or more interface portions, which may also be referred to as interface portion(s) 230-$i$ or interface portions 240) for enabling optical communication between the respective radio portion 140-$i$ and the control portion 210. The arrangement further comprises optical links 220-1 and 220-2 (representing one or more optical links, which may also be referred to as optical link(s) 220-$i$ or optical links 220) for connecting the respective optical interface portion 230-$i$ to the control portion 210. An optical link 220-$i$ is, preferably, provided using one or more optical cables that are detachably connectable to the control unit 210 and/or to the respective interface portion 230-$i$. An optical cable may comprise one or more optical fibers, as will be described in more detail later in this document. The communication arrangement 200 may also be referred to as a communication apparatus.

FIG. 2 further depicts the one or more radio portions 140-$i$ for communication with radio portions of remote communication arrangements over radio frequencies. The radio portions 140-$i$ may be configured to enable audio communication and/or data communication. The optical interface portions 230-$i$ are connectable to respective radio portions 140-$i$ to provide the link between the radio portions 140-$i$ and the control portion 210. FIG. 2 further illustrates the microphone 150 (or a number of microphones) for capturing audio signals and one or more loudspeakers 160 (e.g. a pair of loudspeakers) for reproducing audio signals, both the microphone 150 and the loudspeaker(s) 160 connected or coupled to the control portion 210.

The communication arrangement 200 hence enables a user to have audio communication and/or data communication between one or more other users. The control portion 210 and the one or more interface portions 230-$i$ together with the optical links 220-$i$ connecting the respective interface portions 230-i with the control portion 210 may be considered as a (communication) apparatus for controlling communication over one or more radio links. The user may apply the (communication) apparatus to control one of the one or more radio portions 140-$i$ to communicate with another user employing an interoperable radio portion, e.g. with another user using a communication arrangement comprising a radio portion of similar type than the one the (first) user is employing for communication.

The control portion 210 is typically provided in its dedicated housing, separately from the other components of the communication arrangement 200. Similarly, each of the interface portions 230-$i$ is preferably provided in its dedicated housing provided with an arrangement for connecting the optical interface portion 230-$i$ to the respective radio portion 140-i, while each of the one or more radio portions 140-$i$ is typically also provided in its dedicated housing. The arrangement of providing an interface portion 230-$i$ and the respective radio portion 140-$i$ in separate housing enables flexibility in replacing the radio portion 140-$i$ with another one (having similar characteristics) e.g. in case of malfunction or damage without also replacing the interface portion 230-$i$. As an alternative, the interface portion 230-$i$ may be provided in the same housing with the respective radio portion 140-i, thereby providing the arrangement 200 as a smaller number of separate entities. Moreover, the microphone 150 and the loudspeaker(s) 160 are provided separately from the control portion 210, arranged e.g. in a headset. In summary in this regard, the communication arrangement 200 may be considered as a distributed communication arrangement (which may also be referred to as a distributed communication apparatus), where at least two of the components are provided as separate entities interconnected by an optical link 220-$i$. As an example in this regard, the dashed rectangles in FIG. 2 each represent a single entity, thereby providing an example of a possible division of the components of the communication arrangement 200 and components connectable thereto into separate entities.

Due to distributed approach, there is the flexibility to mount or install the entities of the communication arrangement 200 according to requirements of the actual usage scenario. In one exemplifying usage scenario, the communication arrangement 200 may be provided for personal use by a single user. Consequently, the user may make use of the distributed approach by mounting the entities constituting the communication arrangement 200 in his/her gear as he/she sees appropriate. In such a scenario the control portion 210 is, typically, provided in control unit/entity that is attachable to the clothes or other personal gear worn or carried by the user in a location that is easily accessible by the user. In another exemplifying usage scenario, the communication arrangement 200 may be provided for use by a co-located group of users sharing the communication arrangement 200. Consequently, the entities of the communication arrangement 200 may be installed in the fixed structures of the location of use e.g. inside a vehicle or inside a room. In such a scenario the control portion 210 is typically provided in a control unit/entity that is mountable to location (on a wall, on a tabletop, on a dashboard of a vehicle, etc.) that is easily accessible by the group of users. In both these exemplifying scenarios a user may have access the communication arrangement by connecting his/her personal microphone 150 and speaker(s) 160 (arranged e.g. in a headset worn by the user) to the control unit 210.

An advantage of employing the optical links 220-$i$ e.g. instead of the electrical wires of the communication arrangement 100 is that the they provide full electrical decoupling between the components of the communication arrangement 200, i.e. between the control portion 210 and the interface portions 230-i. Consequently, typically the remaining significant electrical coupling is between each pair of an interface portion 230-$i$ and the respective radio portion 140-i.

While this has the effect of reducing the electrical interferences between the radio portions 140-$i$ connected to the communication arrangement 200, there is also another—perhaps even more important—advantage arising from this electrical decoupling: instead of configuring all components of a communication arrangement, possibly together with the components connected thereto, as a single entity such that they jointly conform to the desired EMC and/or IS requirements (as is the case e.g. with the communication arrangement 100), the optical links 220-*i* of the communication arrangement 200 enables configuration of the control portion 220, possibly together with the microphone 150 and the loudspeaker(s) 160 as well as or other components/entities possibly connected/connectable thereto, to meet the requirements related to the EMC and/or IS independently of (the interface portions 230-*i* and) the radio portions 140-i. Similarly, the communication arrangement 200 enables configuration of each pair of the interface portion 230-*i* and the respective radio portion 140-i connected/connectable thereto to meet the EMC and/or IS requirements independently of the configuration of the other components of the communication arrangement 200. Consequently, the measures to be taken to ensure fulfilling relevant EMC requirements (such as shielding of housings of the components of the communication arrangement 200 and/or electrical wires connecting within and/or between the components, filtering of electrical signal within and/or between the components of the communication arrangement 200) can be applied to a lesser extent, thereby contributing to simplified design of the communication arrangement 200 that is likely to result in reduced cost of implementation and design. Similarly, the measures to be taken to ensure fulfilling relevant IS requirements (such as matching the interconnect parameters in an interface between components of the communication arrangement 200, especially in the interface(s) between the interface portion(s) 230-*i* and the respective radio portion(s) 140-i, e.g. (maximum) voltages, currents and/or power levels as well as impedances and/or capacitances in the interfaces) can be applied to a lesser extent, thereby further contributing to simplified design of the communication arrangement 200 that is likely to result in reduced cost of implementation and design, while also contributing to improved performance in employing the radio portion(s) 140-i.

Such independent configuration contributes to avoid any conflicting or ill-matching requirements arising e.g. from different radio protocols and transmission techniques applied in the radio portions 140-*i* that could compromise the overall performance of the communication arrangement 200 when configured to meet the EMC and/or IS requirements. Moreover, such independent configuration of the interface portion 230-i/radio portion 140-*i* pairs enables straight-forward extensibility of the communication arrangement 200: e.g. when adding a new radio portion 140-*i* to the communication arrangement 200, there is no need to re-configure the communication arrangement 200 as a whole to ensure meeting the EMC and/or IS requirements but it is sufficient to configure the newly introduced pair of interface portion 230-i/radio portion 140-*i* since the conformance to the EMC and/or IS requirements in the existing components of the communication arrangement 200 is not affected by introduction of the new interface portion 230-i/radio portion 140-*i* pair due to electrical decoupling enabled by the optical links 220-i.

The radio portions 140-*i* preferably enable bi-directional PTT communication over a PMR system. Such radio portion 140-*i* provides half-duplex point-to-point or point-to-multipoint connection over a radio link to a remote radio portion/unit applying the same radio communication protocol. In other words, each radio portion 140-*i* may be configured to enable (PTT) communication over a predetermined (PMR) protocol. The radio portions 140-*i* may apply digital or analog radio systems. Several such radio protocols, typically operating on a frequency band of the Very High Frequency (VFH) range or the Ultra High Frequency (UHF) range, are known in the art, examples including the Terrestrial Trunked Radio (TETRA), Project 25 (P25 or APCO-25) radio, MPT-1327 radio, Digital Mobile Radio (DMR) and Private Role Radios (PRR) such as H4855 PRR.

A radio portion 140-*i* may enable communication over a single communication channel or a radio portion 140-*i* may enable communication over two or more communication channels. In this context, a communication channel refers to logical connection between the radio portion 140-*i* and one or more corresponding radio units of one or more remote users. Hence, depending on the applied radio protocol/technology and the desired mode of communication over a communication channel, the communication channel may provide a connection to a specific remote user and/or location, to a specific call group (i.e. to a number of remote users and/or locations), at a specific frequency band or channel, etc. The radio portions 140-*i* are preferably pre-configured to provide a predetermined communication channel or two or more predetermined communication channels, while the control unit 210 provides the user with means for invoking communication over one of the communication channels provided by the one or more radio portions 140-i, as will be described in more detail later in this document.

The microphone 150 and the loudspeaker 160 may be provided e.g. as a headset providing a loudspeaker or a pair of loudspeakers 160 arranged as headphones with the microphone 150 mounted thereto, the headset being connectable to the control portion 210. As another example, the microphone 150 and one or more loudspeakers 160 may be integrated to a handheld audio input/output entity, which may be referred to as a (remote) speaker-microphone (RSM) unit, and which is connectable to the control portion 210. As a further example, the microphone 150 and/or the one or more loudspeakers 160 may be integrated to a helmet or to a helmet system to be worn by the user of the communication arrangement 200. Regardless of the arrangement(s) applied for providing the microphone 150 and/or the loudspeaker 160, they are, preferably, detachably connectable to the control unit 210 via electrical wiring. As another example, the arrangement(s) for providing the microphone 150 and/or the loudspeaker may be connectable to the control unit by a (short-range) wireless link, such as Bluetooth or Wireless Local Area Network (WLAN). In other words, the microphone 150 and the loudspeaker(s) 160 are typically provided as separate entities or as a single separate entity that is detachably connectable to the housing of the entity comprising control portion 210. Such an arrangement may be especially useful in a usage scenario where a group of (co-located) users may connect their personal arrangement of microphone 150 and loudspeaker(s) 160 to the control unit 210 when they wish to communicate using one of the radio portions 140-i.

The control portion 210 serves as the entity that at least controls transmission of (uplink) audio by the one or more radio portions 140-*i* in accordance with commands provided by the user of the communication arrangement 200 and that controls reproduction of (downlink) audio in accordance with data received from the one or more radio portions 140-i.

Figure 3:
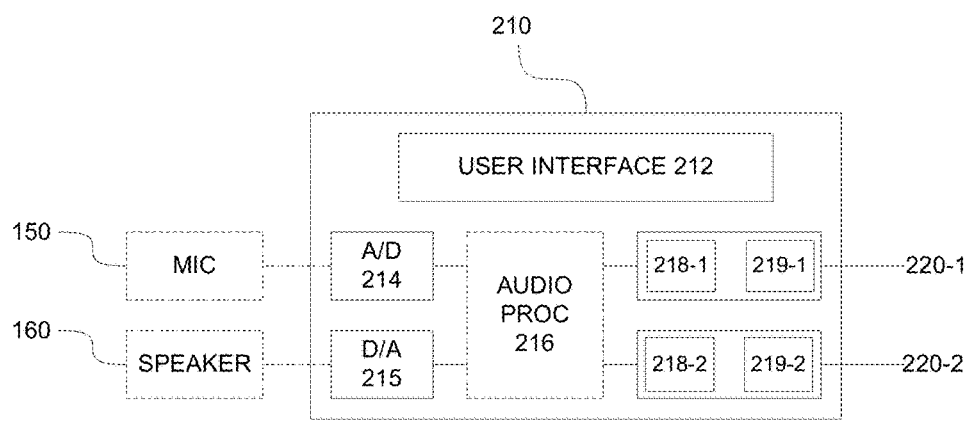
FIG. 3 schematically illustrates some components of a control portion in accordance with an example embodiment of the invention.

FIG. 3 schematically illustrates some components of the control portion 210. The control portion 210 is provided with a user interface 212 comprising control means that enable the user of the communication arrangement 200 to control operation of the one or more radio portions 140-*i* in order to transmit and/or receive audio signals over one or more communication channels. In particular, the user interface 212 may be configured to enable the user to apply the PTT communication method employing the communication channel of his/her choice. In this regard, the user interface 212 may comprise one or more user-operable push-buttons, provided e.g. as keys or as a keyboard on the housing of the entity comprising the control portion 210. A push-button or a key of the user interface 212 may be employed to toggle the corresponding communication channel in one of the radio portions 140-*i* between a speaking mode and a listening mode. The speaking mode may also be considered as a transmission mode while the listening mode may be considered as a reception mode.

As an example, pressing and holding a push-button or a key may cause the control portion 210 to provide, via the respective optical link 220-i, one or more control signals for setting or keeping the corresponding communication channel in the respective radio portion 140-*i* in the speaking mode. In contrast, not pressing (or releasing) the push-button or the key may cause the control portion 210 to provide, via the respective optical link 220-i, one or more control signals for keeping or setting the corresponding communication channel in the respective radio portion 140-*i* in the listening mode. Alternatively, non-provision of the control signal(s) for indicating the speaking mode may be interpreted as an indication of the listening mode. In such an arrangement the control portion 210 may omit provision of a dedicated control signal(s) indicating the listening mode but may rely on the lack of control signal indicating the speaking mode for a certain communication channel serving as an indication of the listening mode for the respective communication channel.

Concurrently with provision of the control signal(s) indicating the speaking mode, the control portion 210 may be arranged to provide the (input) audio signal received from the microphone 150 to the respective optical interface portion 230-*i* for subsequent transmission over the selected communication channel by the respective radio portion 140-i, whereas in the listening mode the control portion 210 may be arranged to provide the audio signal received from one of the optical interface portions 220-*i* to the loudspeaker(s) 160 for reproduction to the user of the communication arrangement 200.

Processing of the (input) audio signal to be provided to one of the optical links 220-*i* may comprise several steps, some of which are described in the following. In this regard, the control portion 210 comprises means for converting an (input) audio signal from analog format to digital format, e.g. an analog-to-digital (A/D) converter 214. The A/D converter 214 typically provides a digital audio signal, such as Pulse-Code Modulation (PCM) signal, at a predetermined sampling rate (or sampling frequency). As an example, the sampling rate may be e.g. 8 kHz or 16 kHz. The control portion 210 further comprises optical transmitters 218-1 and 218-2 (representing one or more optical transmitters 218-i), arranged to receive the digital audio signal as an electrical signal, to convert the electrical signal into an optical signal, and to provide the optical signal via the optical link 220-*i* to the respective optical interface portion 230-i. The (input) audio signal, typically originating from the microphone 150, passed from the control portion 210 towards one of the interface portions 230-i may be referred to as an uplink audio signal.

Along similar lines, processing of the audio signal received (as an optical signal) from one of the optical links 220-*i* may comprise several steps, some of which are described in the following. In this regard, the control portion 210 comprises optical receivers 219-1 and 219-2 (representing one or more optical receivers 219-i), arranged to receive the digital audio signal as an optical signal from one of the optical links 220-i, to convert the optical signal into an electrical signal, and to provide audio signal as an electrical signal for provision to the loudspeaker(s) 160 and hence for provision for presentation to the user. The optical receiver 219-*i* may be provided separately from the respective optical transmitter 218-i, or the optical receiver 219-*i* may be provided jointly with the optical transmitter 218-i, thereby forming an optical transceiver portion for the respective optical link 220-i. The control portion 210 further comprises means for converting an audio signal from digital format into analog format, e.g. a digital-to-analog (D/A) converter 215, to the audio signal in an analog format and hence in a format suitable for provision e.g. to the loudspeaker(s) 160. The audio signal received via one of the optical links 220-*i* may be referred to as a downlink audio signal.

The control portion 210, typically, comprises an audio processing portion 216, arranged to pre-process the uplink audio signal before provision to the optical link 220-*i* in order to meet the (predetermined) requirements for transfer over the optical link 220-i. Similarly, the audio processing portion 217 may be arranged to post-process the downlink audio signal before provision to the D/A converter 215 in order to provide an audio signal exhibiting desired characteristics, e.g. to meet the (predetermined) requirements for audio an audio signal considered suitable for representation to a user. The audio processing may include, for the uplink and or downlink audio signal e.g. one or more of the following: noise cancellation/suppression in the audio signal for improved voice quality and intelligibility of the audio signal, automatic gain/level control of the audio signal to ensure appropriate audio signal level, compression or decompression of the dynamic range of the audio signal, modifying the frequency characteristics of (i.e. filtering, e.g. band-pass or low-pass filtering) the audio signal to meet a predetermined criteria. In particular, the audio processing portion 216 is arranged to carry out audio processing that is applied in a similar manner regardless of the destination of the uplink audio signal or the source of the downlink audio signal. In contrast, any communication channel or radio portion specific (audio) signal processing is carried out in the respective interface portion 230-i. Such distribution of audio processing functions serves to simplify the structure of the control portion 210 since there is no need to include (audio) processing functions that are specific to a certain communication channel and/or to a radio portion of certain characteristics that, eventually, may or may not be coupled to the control portion 210. Therefore, exactly the same configuration of the control portion 210 may be employed regardless of the characteristics of the radio portions 140-*i* coupled or to be coupled thereto.

In a variation of the operation of the control portion 210 regarding the control of the speaking and listening modes described above, a voice activation technique may be employed in order to toggle between the speaking mode and the listening mode. In this regard, the audio processing portion 216 may be (further) configured to apply voice activity detection (VAD) technique or similar technique in order to detect an input audio signal that represents active voice. Such techniques are known in the art. Consequently, the control portion 210 may be configured, in response to detecting the input audio signal to comprise active voice, to provide a control signal for setting a communication channel in the speaking mode. In contrast, the control portion 210 may be configured, in response to failing to detect the input audio signal to comprise active voice (or detecting the input audio signal not to comprise active voice), to provide control signal(s) for keeping or setting all communication channel in the listening mode. In case the selection of the speaking/listening mode relies on a voice activation technique, the push-buttons of the user interface 212 may applied as selection means for the applied communication channel.

In a scenario where the control unit 210 is configured to enable communication over a single communication channel by each of the one or more radio portions 140-*i* connectable thereto, explicit control signals providing an indication regarding the speaking/listening mode may be omitted: in such a scenario an interface portion 230-*i* receiving the uplink audio signal serves as an indication of a start of the speaking mode in the sole communication channel provided by the respective radio portion 140-i, while on the other hand the interface portion 230-*i* not receiving the uplink audio signal indicates the listening mode for the sole communication channel of the respective radio portion 140-i.

Instead of or in addition to audio signal data, the communication arrangement 200 may be configured to enable transmission and/or reception of generic (binary) data over one of the communication channels provided by the radio portion(s) 140-i. In this regard, the control portion 210 may be provided with one or more data ports for receiving (uplink) data for transmission over one of the communication channels and/or for providing data received over one of the communication channels. A data port may be for example a serial data port such as a RS-232 data port, a RS-485 data port, a USB (Universal Serial Bus) port, a NMEA 0183 (National Marine Electronics Association) port, etc. As a particular example, the data to be received via the data port (for transmission over a communication channel) may be location data, e.g. GPS (Global Positioning System) data originating from a positioning/navigation device for indicating the location of the communication arrangement 200 while the data (received over a communication channel) to be provided via the data port may be location data indicating the location of a remote communication arrangement. For transfer of location data, the data port may be provided as a NMEA 0183 port. Instead or in addition to location data, the data received/provided via the one or more data ports may be basically any data, e.g. data representing stream of IP (Internet Protocol) packets. Data to be transmitted over a communication channel is, preferably, received with address information indicating the communication channel and/or the radio portion 140-*i* over which it is to be transmitted by the communication arrangement 200. However, e.g. in a scenario where the communication arrangement 200 employs only a single radio portion 140-*i* arranged to provide a single communication channel, such address information may not be necessary and it may be omitted.

In case the control portion 210 is arranged to enable transmission and/or reception of generic (binary) data, the optical transmitter(s) 218-*i* are further arranged to receive the (binary) data as an electrical signal from the data port, to convert the electrical signal into an optical signal, and to provide the optical signal via the optical link 220-*i* to the respective optical interface portion 230-i. The (input) data originating from the data port, to be passed from the control portion 210 towards one of the interface portions 230-i, may be referred to as an uplink data. Along similar lines, the optical receiver(s) 219-*i* may be further arranged to receive the (binary) data as an optical signal from one of the optical links 220-i, to convert the optical signal into an electrical signal, and to provide the data as an electrical signal for provision via the data port. The (binary) data received via one of the optical links 220-*i* may be referred to as a down-link data. The control portion 210 may be arranged to pass the data between the control port and the optical transmitter or receiver 218-i, 219-*i* without modifications or the control portion 210 may comprise a data processing portion for adapting characteristics of the data. In general, the data processing portion may be applied for data processing that ensures that the data to be provided to the optical link 220-*i* meets the (predetermined) requirements of the link and/or that the data to be provided to the data port meets the (predetermined) requirements of the port. As an example, the data processing portion may be configured to convert the data from a format applied in the data port to a format suitable for provision over the optical link(s) 220-i, and, conversely from the format applied in the optical link(s) 220-*i* to the format applied in the data port. As another example, the data processing portion may convert the data rate into one suitable for provision via the data port or over the optical link 220-i.

As briefly referred to hereinbefore, the control portion 210 may be arranged to provide, to a respective radio portion 140-i, control signal(s) that serve as an indication of a certain communication channel being in the speaking mode and possibly also to provide control signal(s) that serve as an explicit indication of a certain communication channel being in the listening mode. Such control signals may comprise e.g. a control signal indicating the speaking/listening mode and a control signal that identifies the communication channel for which the speaking/listening mode indication is provided (in case the respective radio portion 140-*i* is configured to provide two or more communication channels). Additionally or alternatively, the control portion 210 may be configured to issue or provide uplink control signals of other type to control communication over a certain communication channel and/or to control operation of a certain radio portion 140-i. As an example, there may be an uplink control signal for setting a certain radio portion 140-*i* on or off, an uplink control signal for changing or adjusting characteristics of (a given communication channel of) a certain radio portion 140-i, an uplink control signal for increasing or decreasing transmission power for a certain communication channel, etc. As a further example, in case the control portion 210 is arranged to enable transmission and/or reception of generic (binary) data, there may be an uplink control signal that explicitly indicates the type of the uplink signal, e.g. whether the respective uplink signal represents uplink audio signal or uplink (binary) data.

Along similar lines, the control portion 210 may be arranged to receive control signals via the optical link(s) 220-i. Such (downlink) control signals may comprise, as an example, a control signal that that identifies the communication channel from which the respective downlink signal is being received (in case the respective radio portion 140-*i* is configured to provide two or more communication channels). As another example, in case the control portion 210 is arranged to enable transmission and/or reception of generic (binary) data, there may be a downlink control signal that explicitly indicates the type of the respective downlink signal, e.g. whether the downlink signal represents downlink audio signal or downlink (binary) data. As further options, the control signal serving as a type indication may indicate the downlink signal to comprise a notification, an indication or an alarm received over a communication channel.

The optical transmitter 218-*i* may be further arranged to convert any control signal issued by the control portion 210 from an electrical signal into an optical signal. As an example in this regard, the optical transmitter 218-*i* may be configured to receive the control signal for keeping/setting one of the radio portions 140-*i* in the speaking mode or in the listening mode, convert the control signal into an optical control signal, and transmit the optical control signal via the respective optical link 220-$i$ to the respective optical interface portion 230-i. The optical transmitter 218-$i$ may be further configured to apply conversion of similar kind to any further control signals to be provided to one of the interface portions.

The control portion 210 may further comprise additional portions or components, such as a controller or a processor for controlling the operation of the control portion 210 in accordance with the user input and the signals received via the optical links 220-i. The control portion 210 may further comprise a memory for (temporarily) storing the audio signals, control signals and other data and possibly also for storing program code to be executed by the controller/ processor to implement control of the operation of the control portion 210.

The control portion 210, e.g. the user-interface 212, may comprise a display for displaying information to the user of the communication arrangement 200.

The interface portions 230-$i$ serve as entities providing an interface function between the control portion 210 and the radio portion 140-$i$ to which the interface portion 230-$i$ is connectable or connected. The interface portion 230-$i$ is connected to the control portion 210 via the respective optical link 220-$i$ and connectable to the respective radio portion 140-$i$ via an electrical connection. The electrical connection may be provided e.g. by electrical wiring between the interface portion 230-$i$ and the respective radio portion 140-$i$ and/or by matching one or more electrical connectors arranged in the housing of the interface portion 230-$i$ and in the housing of the respective radio portion 140-i. As an example, the one or more electrical connectors may provide one or more connection ports for connecting the radio portion 140-$i$ to the respective interface portion 230-i, where the one or more connection ports may comprise one or more of the following: an audio port for transfer of digital audio signals, a data port for transfer binary data (e.g. a NMEA 0183 port for transfer of location data), a control port for transfer of control signals and control information.

Figure 4:
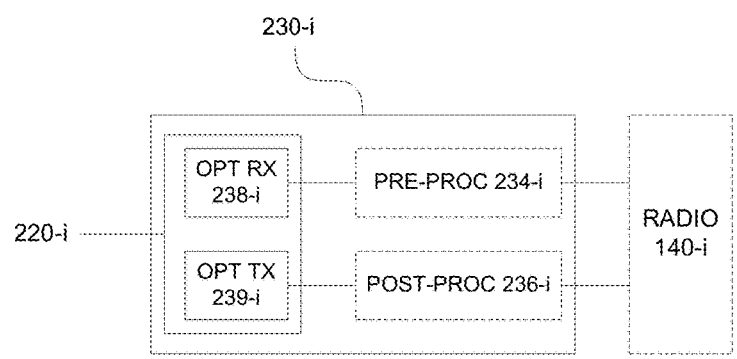
FIG. 4 schematically illustrates some components of an interface portion in accordance with an example embodiment of the invention.

In a most straightforward embodiment, the interface portion 230-$i$ only provides conversion between the optical and electrical representations of the digital audio signals or generic (binary) data. In this regard, the interface portion 230-i comprises an optical receiver 238-$i$ and an optical transmitter 239-$i$, as schematically illustrated in FIG. 4. The optical receiver 238-$i$ and the optical transmitter 239-$i$ may be provided separately from each other, or the optical receiver 238-$i$ and the optical transmitter 239-$i$ may be jointly provided, thereby forming an optical transceiver portion of the interface portion 230-i. The optical receiver 238-$i$ is arranged to receive the digital audio signal (from the respective optical link 220-i) as an optical signal from the respective optical link 220-i, to convert the optical signal into an electrical signal, and to provide audio signal as an electrical signal for provision to the respective radio portion 140-i. The optical transmitter 239-$i$ is arranged to receive the digital audio signal as an electrical signal (from the respective radio portion 140-i), to convert the electrical signal into an optical signal, and to provide the optical signal via the respective optical link 220-$i$ to the control portion 210 for further processing and subsequent reproduction to the user.

Each of the interface portions 230-$i$ is tailored to match the characteristics of a radio portion 140-$i$ of a certain type. The match may be provided e.g. by configuring the interface portion 230-$i$ to process the (audio) signals to be provided to the respective radio portion 140-$i$ connectable thereto to meet the requirements of that particular (type of) radio portion 140-$i$ e.g. in terms of format of the audio signal, level of the audio signal, power of the audio signal etc. Similarly, the interface portion 230-$i$ may be configured to process the (audio) signals to be received from the respective radio portion 140-$i$ connectable thereto to meet the requirements of the control portion 210 e.g. in terms of format of the audio signal, level of the audio signal, power of the audio signal etc.

In this regard, the interface portion 230-$i$ may further comprise an audio preprocessing portion 234-$i$ arranged to receive the digital audio signal from the optical receiver 238-$i$ (i.e. the uplink audio signal) as an electrical signal, process the audio signal and provide the resulting modified audio signal for the respective radio portion 140-i. The audio pre-processing portion 234-$i$ may be configured to modify characteristics of the digital audio signal to facilitate efficient transmission and (possible) audio encoding of the audio signal. Such modification may include e.g. one or more of modifying the frequency characteristics of (i.e. filtering) the audio signal, scaling or limiting the energy level of the (input) audio signal according to a predetermined rule, applying noise cancellation or noise suppression to the audio signal, conversion of the sampling rate of the audio signal into one suitable for further processing of the audio signal in the respective radio portion 140-i, etc. Alternatively or additionally, the audio pre-processing portion 234-$i$ may be configured to apply audio encoding (i.e. audio compression) to the audio signal in order to reduce the data rate of the audio signal to be transferred over a radio link by the respective radio portion 140-i. The audio encoding may be considered as a transformation of the audio signal from the audio domain into a compressed domain. In general, the audio pre-processing portion 234-$i$ may be configured to apply audio signal modification and/or audio encoding in accordance with characteristics and/or requirements of the respective radio portion 140-i, e.g. in order to adapt the audio signal to meet the requirements of the communication protocol applied by (the corresponding communication channel of) the respective radio portion 140-i.

The interface portion 230-$i$ may further comprise an audio post-processing portion 236-$i$ arranged to receive the digital audio signal from (the corresponding communication channel of) the respective radio portion 140-i, process the audio signal and to provide the resulting modified audio signal for provision over the respective optical link 220-i. The audio post-processing portion 236-$i$ may be configured to modify characteristics of the received digital audio signal to facilitate providing the audio signal over the respective optical link 220-i, to adapt the audio signal to meet the requirements of the control portion 210 and/or to facilitate providing an audio signal of desired characteristics for subsequent reproduction to the user. Such modification may include e.g. one or more of filtering of the audio signal, scaling or limiting the energy level of the audio signal according to a predetermined rule, applying echo cancellation or echo suppression to the audio signal, conversion of the sampling rate into one suitable for subsequent processing in the control portion 210, etc. Alternatively or additionally, in case the audio signal is received from the respective radio portion 140-$i$ in a compressed format, the audio post-processing portion 236-i may be further configured to apply audio decoding (i.e. audio decompression) to the received audio signal in order to convert the audio signal from the compressed domain into the audio domain for the subsequent processing/ modification of the audio signal in the interface portion 230-*i* and/or in the control portion 210. Instead of being provided as separate dedicated portions, the audio pre-processing portion 234-*i* and the audio post-processing portion 236-*i* may be jointly provided in the interface portion 230-*i* as an audio processing portion.

In particular, the audio pre-processing portion 234-*i* and/or the audio post-processing portion 236-i, if provided in the respective interface portion 230-i, are configured to carry out any radio portion 140-*i* specific processing of audio signal, while (as described hereinbefore) the audio processing portion 216 in the control portion 210 is arranged to carry out radio portion independent audio processing, i.e. audio processing that is applied in a similar manner regardless of the destination of the uplink audio signal or the source of the downlink audio signal.

The interface portion 230-*i* may be further arranged to receive generic (binary) uplink data from the control portion 210. Consequently, the optical receiver 238-*i* may be configured to convert the uplink data from an optical signal into a corresponding electrical signal, along the lines described hereinbefore for the (uplink) audio signals. Along similar lines, the interface portion 230-*i* may be further configured to receive generic (binary) downlink data from the respective radio portion 140-*i* and, consequently, the optical transmitter 239-*i* may be configured to convert the downlink data from an electrical signal into a corresponding optical signal, along the lines described hereinbefore for the (downlink) audio signals. Moreover, the pre-processing portion 234-*i* may be configured to convert or translate the uplink data from a format received from the control portion 210 into a format suitable for the respective radio portion 140-i, whereas the post-processing portion 236-*i* may be configured to convert/translate the downlink data from a format received from the respective radio portion 140-*i* into a format suitable for the control portion 210.

The interface portion 230-*i* may be further arranged to receive uplink control signals from the control portion 210, such as control signals for controlling the speaking/listening mode of the respective radio portion 140-i. Consequently, the optical receiver 238-*i* may be configured to convert the uplink control signal from an optical signal into a corresponding electrical signal, along the lines described hereinbefore for the (uplink) audio signals. The interface portion 230-i may be further configured to receive downlink control signals from the respective radio portion 140-i. Consequently, the optical transmitter 239-*i* may be configured to convert the downlink control signal from an electrical signal into a corresponding optical signal, along the lines described hereinbefore for the (downlink) audio signals. Moreover, the pre-processing portion 234-*i* may be configured to convert or translate the uplink control signal from a format received from the control portion 210 into a format suitable for the respective radio portion 140-i, while the post-processing portion 236-*i* may be configured to convert/translate the downlink control signal from a format received from the respective radio portion 140-*i* into a format suitable for the control portion 210.

As described hereinbefore, each of the optical links 220-*i* is typically provided as one or more optical cables comprising one or more optical fibers, and the optical cables are preferably detachably connectable to the control unit 210 and/or to the respective interface portion 230-i.

As an example, the optical link 220-*i* may be provided as a single optical cable that enables half-duplex communication, thereby enabling transfer of audio signal (and/or other data) in only one direction at a time. The single optical cable may comprise a single optical fiber or a set of optical fibers.

As another example, the optical link 220-*i* may be provided as a single optical cable that enables simultaneous transfer of audio signal (and/or other data) in both directions, either by employing a set of one or more optical fibers that enable full-duplex communication or by employing two sets of one or more optical fibers where each set is dedicated for communication in one of the directions. As a further example, the two sets of optical fibers may be provided in separate optical cables, thereby providing a dedicated optical cable for both communication directions.

While several configurations of the optical link 220-*i* are applicable within the framework of the communication arrangement 200, in an advantageous solution each of the optical links 220-*i* is provided as an optical cable consisting of a single optical fiber that enables transfer of audio signals (and possibly also other data) in both directions. In particular, the single optical fiber may be dimensioned to enable real-time transfer of audio signals (and possibly also other data) in both uplink and downlink directions. This can be enabled e.g. by transferring a segment of uplink audio signal representing N milliseconds (ms) of audio in the uplink direction during a period that is smaller than or equal to N/2 ms, thereby leaving at least N/2 ms for transfer of corresponding segment of downlink audio in the downlink direction. Consequently, while in practice not providing simultaneous bi-directional data link between the control portion 210 and the interface portion 230-i, the optical link 220-*i* provides data transfer capability that is perceived as simultaneous transfer of audio signals in both directions over the optical link 220-i. Even though the PTT communication is at a given moment of time unidirectional by nature, the communication arrangement 200 enables e.g. transmitting audio signal using a first (communication channel of a first) radio portion 140-*i* while at the same time receiving audio signal via a second (communication channel of a second) radio portion 140-i. Hence, the optical links 220-*i* capable of 'perceived simultaneous transfer of audio signals in both directions' facilitate such simultaneous transmission and reception of audio signals using two radio portions 140-i. Communication protocol(s) applied in the optical links 220-*i* is preferably tailored to fit the requirements of the communication arrangement 200 in terms of available data rate over the optical links 220-*i* and in terms of characteristics of data to be carried over the optical links 220-i. However, details of such communication protocol(s) are outside the scope of the present invention.

Figure 5:
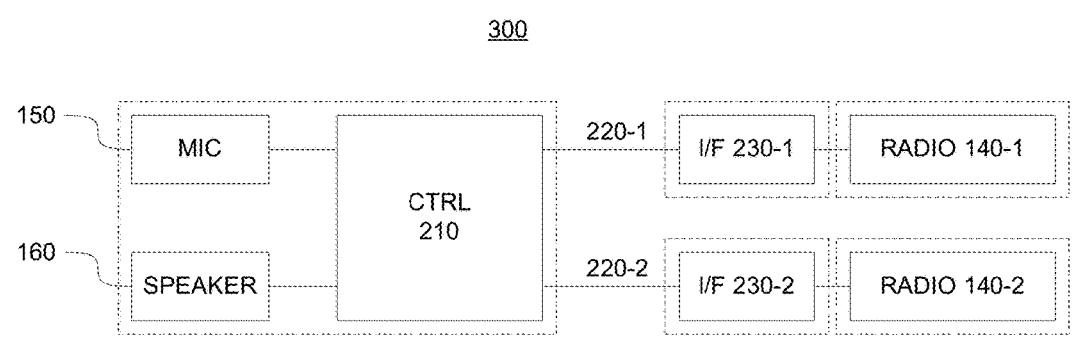
FIG. 5 schematically illustrates some components of an exemplifying communication arrangement or apparatus in accordance with an example embodiment of the invention.

FIG. 5 schematically illustrates some components of an exemplifying communication arrangement 300 as a variation of the communication arrangement 200. In the communication arrangement 300 the microphone 150 and the loudspeaker(s) 160 may be provided in the same entity with the control portion 210, as indicated by the dashed rectangle grouping these components of the communication arrangement 300 into a single entity. In particular, the control portion 210 may be integrated together with the microphone 150 and the loudspeaker(s) 160 into a RSM unit, which in turn is connectable via the optical links 220-*i* and via the respective interface portions 230-*i* to the respective radio portions 140-i. Otherwise the structure and functionality of the communication arrangement 300 correspond to those of the communication arrangement 200.

Figure 6:
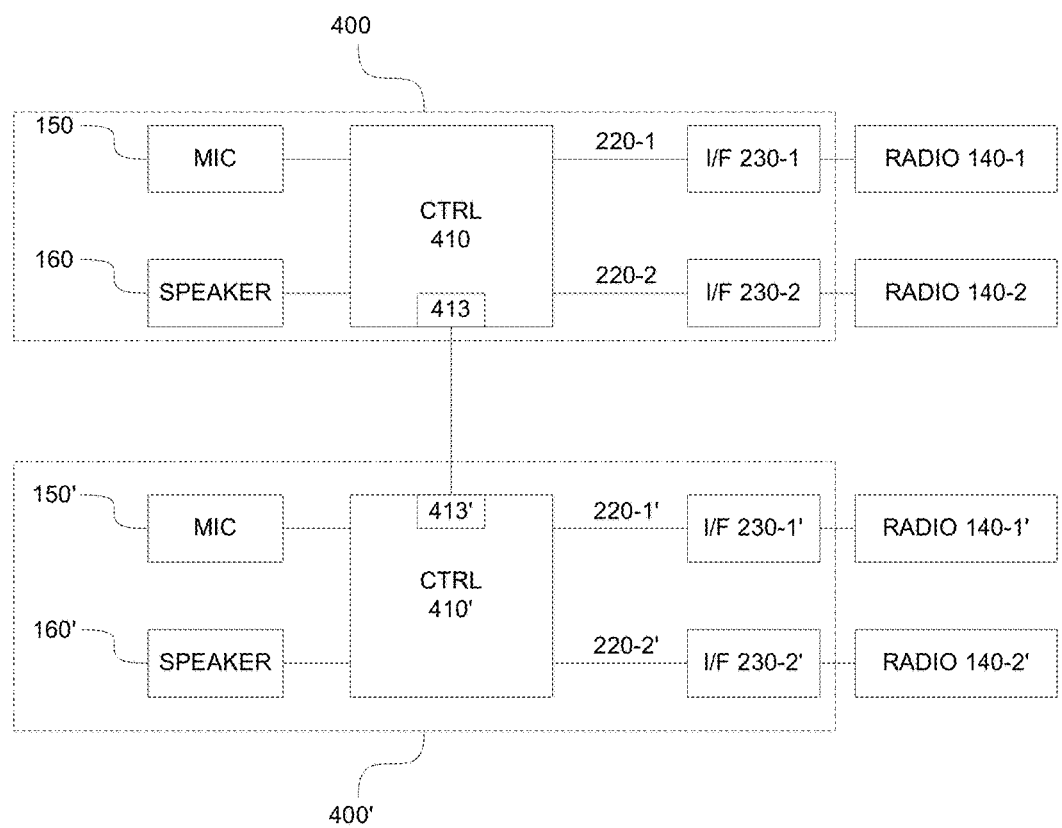
FIG. 6 schematically illustrates some components of an exemplifying communication arrangement or apparatus in accordance with an example embodiment of the invention.

FIG. 6 schematically illustrates some components of an exemplifying communication arrangement 400 as another variation of the communication arrangement 200. The communication arrangement 400 comprises a control portion 410, which in turn comprises a communication interface 413 for enabling the control portion 410 to communicate with a further communication arrangement(s), represented in FIG. 6 by a communication arrangement 400'. Otherwise, the control portion 410 is similar to the control portion 210. The communication arrangement 400' comprises components matching those of the communication arrangement 400 and hence a control portion 410' of the communication arrangement 400' comprises a communication interface 413. In particular, the control portion 410 may be configured to communicate via the communication interface 413, over an electrical connection (e.g. one or more electrical wires) and via the communication interface 413' with the control portion 410', thereby enabling electrical connection between the two communication arrangements 400, 400'. The communication arrangement 400 and/or the communication arrangement 400' may be connected via the respective communication interfaces 413, 413' to further communication arrangements. The control portion 410, 410' may be configured to receive and/or transmit data over the communication interface 413, 413' may be applied to transfer audio signals, generic (binary) data and/or control signals between the control portions 410, 410'.

As an example, a user of the communication arrangement 400' may apply the microphone 150' for audio input and the loudspeaker(s) 160' for audio reproduction while employing one of the radio portions 140-$i$ of the communication arrangement 400 for radio communication. As an example, in such a usage scenario the input (uplink) audio signal originates from the microphone 150', the input audio signal is converted into the digital uplink audio signal in the control portion 410', the digitized uplink audio signal is transferred as an electrical signal via the communication interfaces 413' and 413 to the control portion 410, and the control portion 410 applies the optical transmitter 218-$i$ to convert the digital uplink audio signal into an optical signal before provision over the respective optical link 220-$i$ to the respective interface portion 230-$i$ for subsequent transmission over a desired communication channel. In the reverse audio path, the optical receiver 219-$i$ converts the (digital) downlink audio signal received from the respective optical link 220-$i$ into an electrical signal and transfers the downlink audio signal as an electrical signal via the communication interfaces 413 and 413' to the control portion 410' for D/A conversion and provision for reproduction to the user via the loudspeaker(s) 160'.

As a variation of the above example, the source of the audio signal (in the communication arrangement 400') may be one of the interface portions 230-$i$' instead of the microphone 150' and, similarly, the destination of the audio signal (in the communication arrangement 400') may be one of the interface portions 230-$i$' instead of the loudspeaker(s) 160'. Hence, the control portions 410 and 410' may be arranged to relay or forward (digital) audio signals received over one of the communication channels of the communication arrangement 400 using one of the communication channels of the communication arrangement 400' and/or vice versa.

As another example, a data port of the control portion 410' may serve as a source of generic (binary) uplink data, which is then provided as an electrical signal via the communication interfaces 413' and 413 to the control portion 410, which in turn applies one of the radio portions 140-$i$ connected thereto to transmit the uplink data over the selected communication channel (e.g. as described in context of the communication arrangement 200). In the downlink direction, generic (binary) uplink data received over one of the optical links 220-$i$ is transferred as an electrical signal via the communication interfaces 413 and 413' to the control portion 410' for subsequent provision via the data port of the control portion 410'. As a variation of this example, the source of the generic (binary) data (in the communication arrangement 400') may be one of the interface portions 230-$i$' instead of the data port of the control portion 410' and, similarly, the destination of the generic (binary) data (in the communication arrangement 400') may be one of the interface portions 230-$i$' instead of the data port of the control portion 410'. Hence, the control portions 410 and 410' may be arranged to relay or forward generic (binary) data received over one of the communication channels of the communication arrangement 400 using one of the communication channels of the communication arrangement 400' and/or vice versa.

Figure 7:
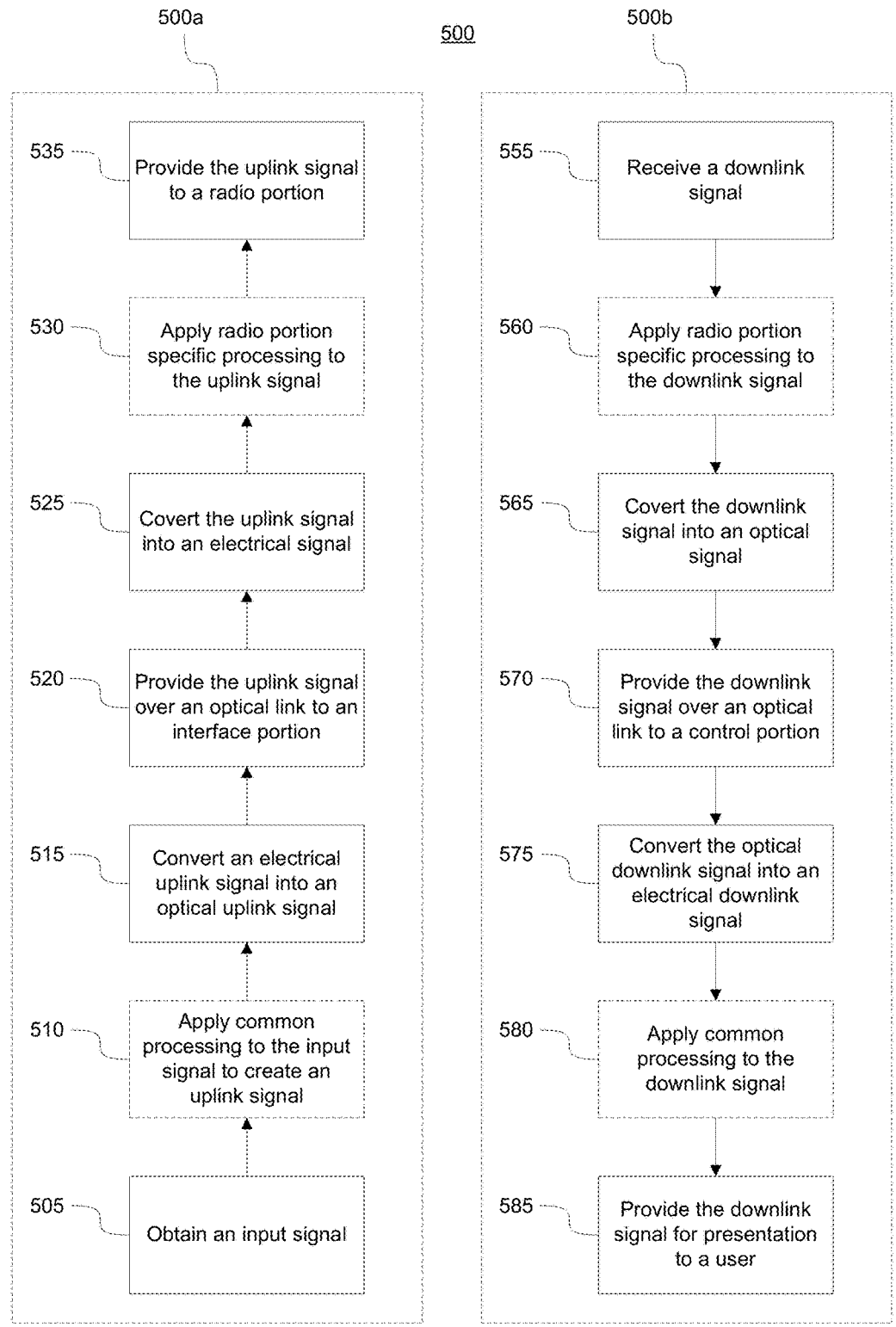
FIG. 7 illustrates a method in accordance with an example embodiment of the invention.

The operations, procedures and/or functions described hereinbefore in context of the communication arrangement 200, 400, in particular in context of the control portion 210, 410 and the interface portion(s) 230-$i$ may also be expressed as steps of a method carrying out the corresponding operation, procedure and/or function. As a non-limiting example in this regard, a method 500 for controlling communication (e.g. PTT communication) over a radio network (e.g. a PMR system) is provided, also illustrated by the flowchart depicted in FIG. 7.

The method 500 comprises providing an uplink signal over an optical link 220$i$, as illustrated in portion 500$a$ of the flowchart and providing a downlink signal over the optical link 220-$i$, as illustrated in portion 500$b$ of the flowchart. Providing the uplink signal comprises obtaining an input signal, as indicated in block 505. The input signal is obtained as an electrical signal. This may involve e.g. capturing and/or receiving an input audio signal. Provision of the uplink signal may further comprise applying common processing to the input signal to create the uplink signal, as indicated in block 510. This may involve e.g. applying audio (pre-)processing that is common to all interface portions 230-$i$ and/or radio portions 140-i, as described e.g. in context of the communication arrangement 200. Providing the uplink signal further comprises converting, e.g. in the control portion 210, the electrical uplink signal into an optical uplink signal for provision to the respective interface portion 230-i, as indicated in block 515. Provision of the uplink signal further comprises providing the uplink signal over the respective optical link 220-$i$ to the corresponding interface portion 230-i, as indicated in block 520. Moreover, provision of the uplink signal further comprises converting, in the interface portion 230-i, the optical uplink signal into an electrical uplink signal for provision to the respective radio portion 140-i, as indicated in block 525. Providing the uplink signal may further comprise applying radio portion specific (or interface portion specific) processing to the uplink signal, as indicated in block 530. This may involve radio portion specific (or interface portion specific) processing of audio signal, as described e.g. in context of the communication arrangement 200. Finally, provision of the uplink signal comprises providing the uplink signal to the radio portion 140-$i$ for transmission over a wireless communication link.

Providing the downlink signal comprises receiving the downlink signal, e.g. over a wireless link, as indicated in block 555. Provision of the downlink signal may further comprise applying radio portion specific (or interface portion specific) processing to the downlink signal, e.g. audio processing, as indicated in block 560. Provision of the downlink signal further comprises converting the downlink signal from an electrical signal into an optical downlink signal for provision to the control portion 210, as indicated in block 565. Provision of the downlink signal further comprises providing the (optical) downlink signal over the optical link 220-*i* to the control portion 210, as indicated in block 570, followed by converting the optical downlink signal, in the control portion 210, into an electrical downlink signal, as indicated in block 575. Providing the downlink signal may further comprise applying common processing to the downlink signal, as indicated in block 580. This may involve e.g. applying audio (post-) processing that is common to all interface portions 230-*i* and/or radio portions 140-*i*, as described e.g. in context of the communication arrangement 200. Finally, provision of the downlink signal comprises providing the downlink signal for presentation to the user.

The method 500 provides an example that may be varied and or complemented in a number of ways, e.g. as described in more detail in context of the communication arrangements 200 and 400.

The invention claimed is:

1. A communication apparatus for push-to-talk communication over a professional mobile radio, the apparatus comprising:
a control portion for controlling the push-to-talk communication, the control portion connectable to a microphone and to a loudspeaker and comprising a first optical transceiver portion configured to
convert an optical downlink signal into an electrical downlink audio signal for presentation to a user via said loudspeaker, and
convert an electrical uplink audio signal received from said microphone into an optical uplink signal for provision to an interface portion;
two or more separate interface portions, and
two or more separate and dedicated bi-directional optical links for connecting the control portion to a respective one of the two or more interface portions,
wherein each interface portion is connected to the control portion by a respective one of said two or more separate and dedicated bi-directional optical links, each interface portion connectable to a respective one of two or more radio portions by a respective electrical connection, which radio portion enables communication with one or more remote communication apparatuses via a respective wireless communication link over one or more communication channels, each interface portion comprising a respective second optical transceiver portion configured to
convert a downlink signal received from the respective radio portion as an electrical signal into said optical downlink signal for provision to the control portion, and
convert said optical uplink signal into an electrical uplink signal for provision to the respective radio portion.

2. The apparatus according to claim 1, wherein said downlink and uplink signals comprise audio signals.

3. The apparatus according to claim 2, wherein at least one of said interface portions comprises a first audio processing portion configured to apply radio portion specific audio processing.

4. The apparatus according to claim 3, wherein said first audio processing portion is configured for adapting characteristics of the electrical downlink audio signal to meet requirements of the control portion, and
adapting characteristics of the electrical uplink audio signal to meet requirements of the respective radio portion.

5. The apparatus according to claim 2, wherein the control portion comprises a second audio processing portion configured to apply radio portion independent audio processing.

6. The apparatus according to claim 5, wherein the second audio processing portion is configured for adapting characteristics of the electrical downlink audio signal to meet requirements for an audio signal suitable for presentation to the user, and
adapting characteristics of the electrical uplink signal to meet requirements of the respective optical link.

7. The apparatus according to claim 1, wherein said downlink and uplink signals comprise signals representing generic data.

8. An apparatus according to claim 1, wherein said uplink signals comprise control signals, wherein
the control portion is further configured to convert an electrical control signal for controlling transmission of the uplink audio signal into an optical control signal for provision to a radio portion, and
the one or more interface portions are further configured to convert said optical control signal into an electrical control signal for provision to the respective radio portion.

9. The apparatus according to claim 8, wherein said control signal causes setting the respective radio portion to a transmission mode or to a reception mode.

10. An arrangement for push-to-talk communication over a professional mobile radio comprising an apparatus according to claim 1 and the one or more radio portions, each connected to the respective interface portion by electrical connection.

11. A method for controlling push-to-talk communication over a professional mobile radio using a communication apparatus comprising a control portion for controlling the push-to-talk communication, which control portion is connectable to a microphone and to a loudspeaker and two or more separate interface portions, each interface portion being connected to the control portion by a respective one of two or more separate and dedicated bi-directional optical links, each interface portion connectable to a respective one of two or more radio portions by a respective electrical connection, which radio portion enables communication with one or more remote communication apparatuses via a respective wireless communication link over one or more communication channels, the method comprising:
providing an uplink signal over an optical link, comprising
converting, in the control portion, an electrical uplink audio signal received from said microphone into an optical uplink signal for provision to an interface portion,
providing said optical uplink signal over the respective optical link to an interface portion, and
converting, in the interface portion, the optical uplink signal into an electrical uplink signal for provision to the respective radio portion, and
providing a downlink signal over an optical link, comprising
converting, in an interface portion, a downlink signal received from the respective radio portion as an electrical signal into an optical downlink signal for provision to the control portion,
providing said optical downlink signal over the respective separate and dedicated bi-directional optical link to the control portion, and converting, in the control portion, said optical downlink signal into an electrical downlink audio signal for presentation to a user via said loudspeaker.

12. The method according to claim 11, wherein said downlink and uplink signals comprise audio signals.

13. The method according to claim 12, wherein
providing the uplink signal comprises applying, in an interface portion, radio portion specific audio processing for adapting characteristics of the electrical uplink audio signal to meet requirements of the respective radio portion, and
providing the downlink signal comprises applying, in an interface portion, radio portion specific audio processing for adapting characteristics of the electrical downlink audio signal to meet the requirements of the control portion.

14. The method according to claim 12, wherein
providing the uplink signal comprises applying, in the control portion, generic audio processing for adapting characteristics of the electrical uplink audio signal to meet requirements for an audio signal suitable for presentation to the user, and
providing the downlink signal comprises applying, in the control portion, generic audio processing for adapting characteristics of the electrical downlink audio signal for an audio signal suitable for presentation to the user.

15. The apparatus according to claim 3, wherein the control portion comprises a second audio processing portion configured to apply radio portion independent audio processing.

16. The apparatus according to claim 4, wherein the control portion comprises a second audio processing portion configured to apply radio portion independent audio processing.

17. The method according to claim 13, wherein
providing the uplink signal comprises applying, in the control portion, generic audio processing for adapting characteristics of the electrical uplink audio signal to meet requirements for an audio signal suitable for presentation to the user, and
providing the downlink signal comprises applying, in the control portion, generic audio processing for adapting characteristics of the electrical downlink audio signal for an audio signal suitable for presentation to the user.

* * * * *